Figure 4:
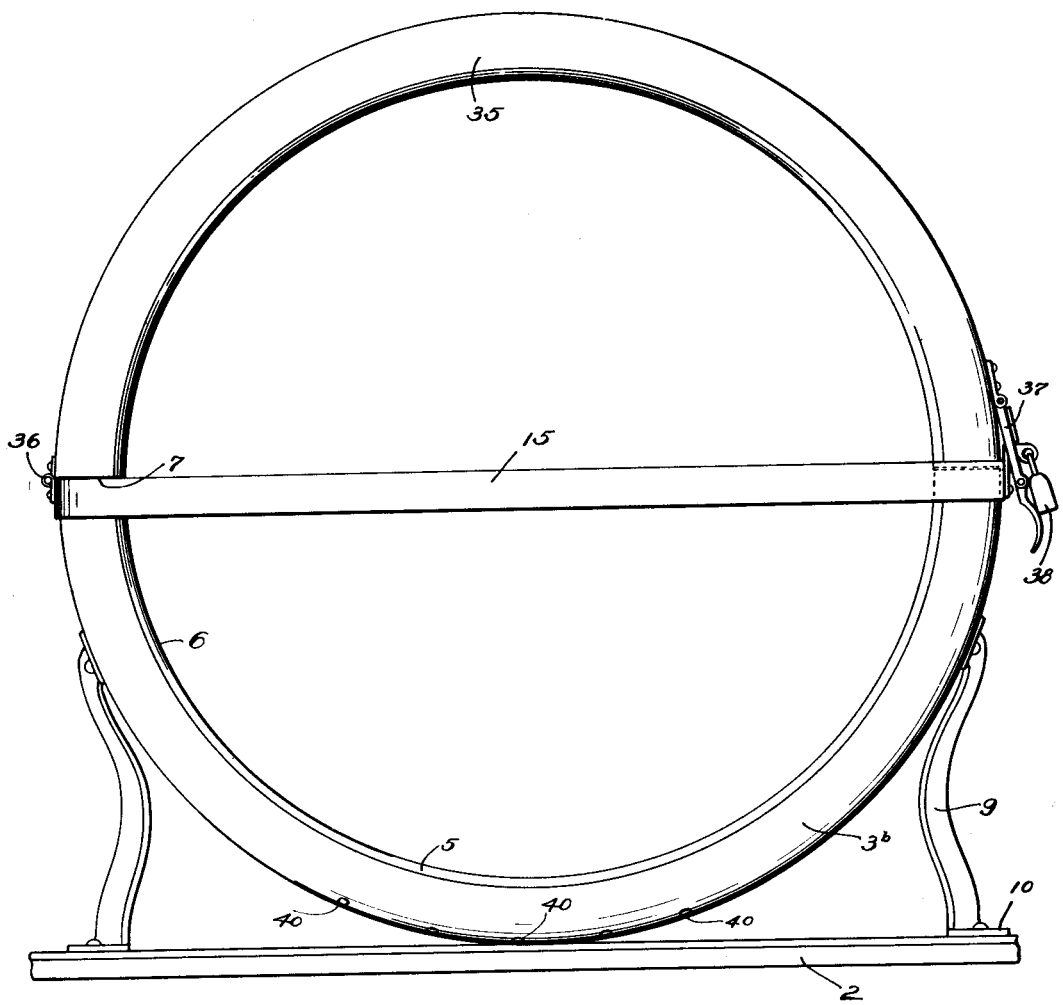

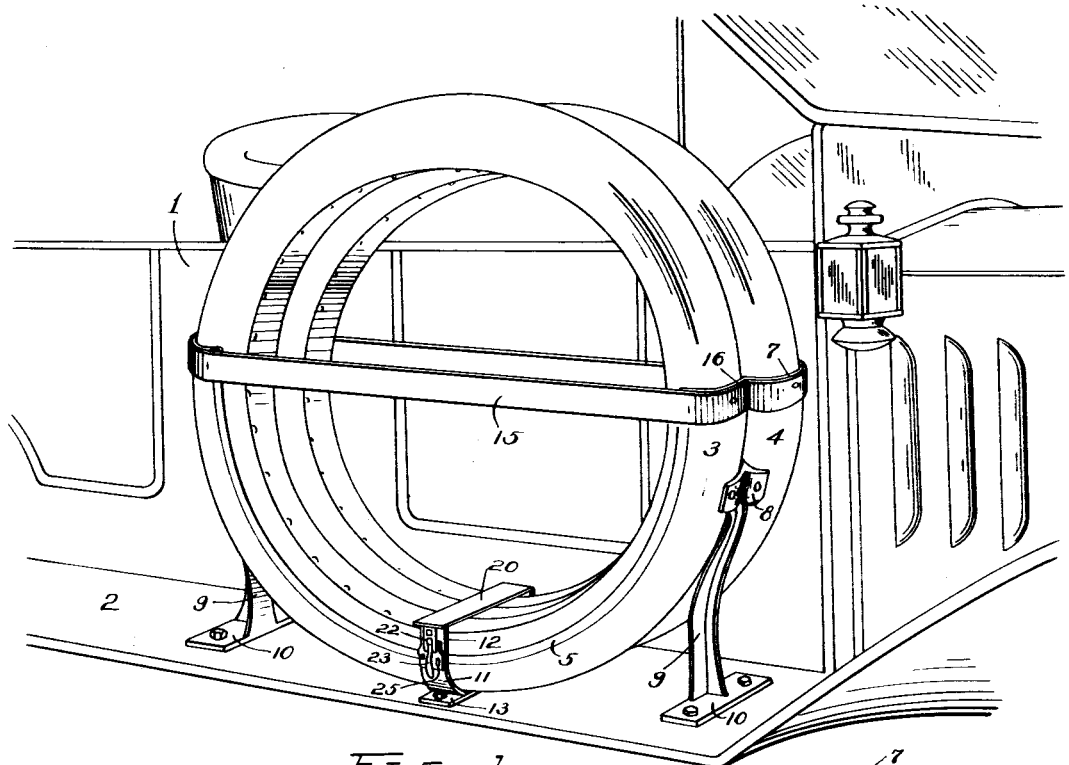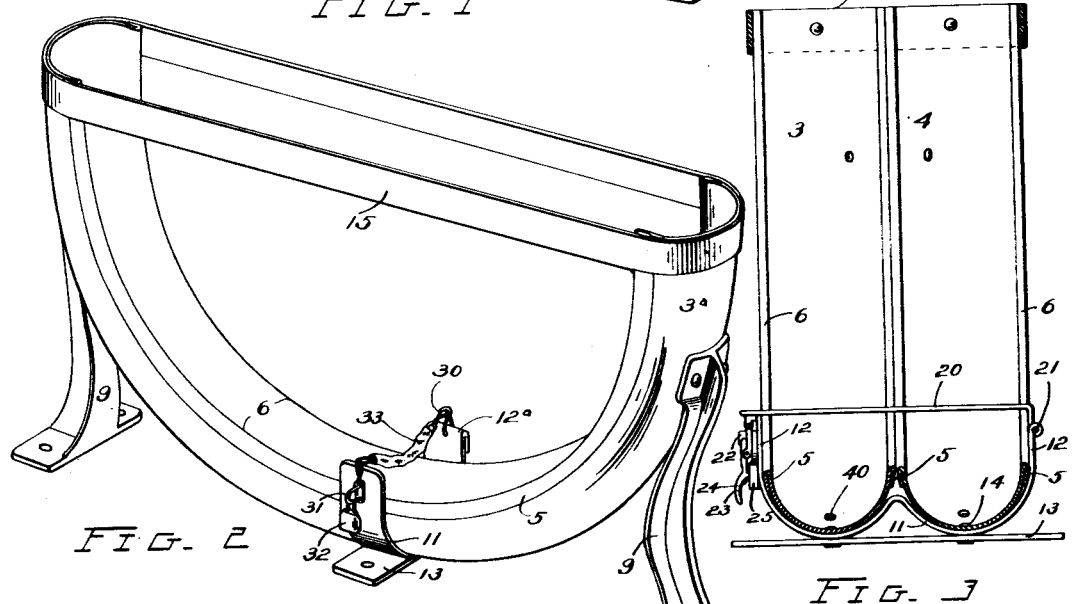

UNITED STATES PATENT OFFICE.

WILFRED C. SLY, OF CLEVELAND, OHIO.

TIRE-BRACKET.

1,111,189. Specification of Letters Patent. Patented Sept. 22, 1914.

Application filed April 25, 1912. Serial No. 693,149.

*To all whom it may concern:*

Be it known that I, WILFRED C. SLY, a citizen of the United States, residing at Cleveland, in the county of Cuyahoga and State of Ohio, have invented a certain new and useful Improvement in Tire-Brackets, of which the following is a full, clear, and exact description, reference being had to the accompanying drawings.

This invention relates to tire brackets or devices whereby an extra tire, either with or without a rim, or a complete wheel, may be carried upon an automobile according to the usual practice.

Among the objects of the invention are the provision of a device of light weight, cheap construction, simple assembling and sightly design which can be conveniently secured to the running board or other suitable part of an automobile and will serve to support the tires in a trim, upright position without permitting them to assume the unsightly leaning position so frequently observed, and which will support the tires so uniformly as to prevent their becoming distorted or set into incorrect shape even after long periods of time.

Another object is the provision, in combination with my improved tire bracket, of simple and efficient locking means whereby unauthorized removal of the tires will be prevented, while other objects and advantages of the invention will be made apparent in the course of the following description and claim.

Generally speaking, my invention may be defined as consisting of the constructions and of the combinations of parts defined in the claim hereto annexed and illustrated in the claim accompanying and forming a part of this application, wherein:

Figure 1 is a perspective view of a part of an automobile equipped with my improved tire bracket; Fig. 2 is a perspective view of a modified tire bracket made in accordance with my invention; and Fig. 3 is a transverse central vertical cross sectional view of the bracket illustrated in Fig. 1, the tires being removed, and Fig. 4 is a side elevational view of a further modification.

Describing the parts by reference characters, 1 represents the body of an automobile and 2 the running board at the right hand side thereof, to which is secured the tire bracket of my invention, although it is obvious that the same may be attached to the left hand running board or to the rear end of the tonneau, at the option of the owner. In the embodiment illustrated in Figs. 1 and 3, this tire bracket is designed to accommodate two tires and consists essentially of a pair of semi-annular metallic channel members formed to receive and embrace closely substantially half of a tire and provided with suitable brackets and straps. These channel members are illustrated at 3 and 4 and are preferably formed by rolling from sheet steel, the thickness of which may be in the neighborhood of sixteen gage, although I do not restrict myself to such a thickness but merely indicate the same as being proper for the purpose. The body of each of the channel members is made to conform closely to the shape of the tire shoe so as to embrace the same uniformly at all points, and preferably subtends substantially a semicircle thereof. The edge portions of the channel members are preferably bent sharply over outwardly as shown at 5 so as to form a smooth round edge 6 which shall prevent laceration of the hands or clothes of the operator or chafing of the tires. The ends of these members are preferably cut away radially as at 7.

When a double bracket is employed as in Figs. 1 and 3, the channel members 3 and 4 are preferably of exactly similar shape and are secured together by being riveted or otherwise rigidly connected to the heads 8 of brackets or standards 9, the lower ends whereof are formed with feet 10 adapted to rest upon the running board. At their lowest point these members are also preferably embraced by a metallic clip 11, the ends of which are preferably bent upwardly as at 12—12 so as to project to a point substantially flush with the inner surface of the tires which are to be transported. A third securing plate 13 may be employed at this point if desired, this plate and the clip 11 being secured to the channel members by means of rivets 14. Obviously either the clip 11 or the plate 13 can be omitted if desired, or the same can be secured at different points about the members. The feet 10 and plate 13 are formed with apertures for the reception of suitable bolts whereby the bracket is secured to the running board.

The upper ends of the members may, if desired, be embraced by a metallic strap 15 suitably secured thereto as by riveting, the upper edges of the strap preferably lying substantially flush with the ends 7. In the twin construction illustrated in Fig. 1 the ends of this strap are preferably abutted at 16 in the angle between the channel members. For securing the tires against unauthorized removal I may employ a metallic hasp 20 hinged to one of the ends 12 of the clip 11 as at 21 and detachably secured to the other of the ends 12 as by the clamp 22. The handle 23 of this clamp may be provided with a projection 24 adapted to be received in a lock 25 in a well known manner. This device is not necessary to the operation of the bracket since the tires are held in place by their form alone. This part is merely to prevent theft.

In case it be desired to transport but a single tire the device illustrated in Fig. 2 may be employed. This device comprises a single channel member 3ª exactly similar to one of the channel members above described and provided with brackets 9—9, clip 11, plate 13, and strap 15. In this embodiment I have illustrated one of the ends 12ª of the clip as apertured for the reception of the terminal link of a chain 30 and the other with a staple 31 for the reception of the opposite end of the chain and of a pad lock 32, the chain being preferably incased by a flexible sleeve 33 whereby chafing of the tire is prevented.

In Fig. 4 I have illustrated a further modification of my device showing the use of a different expedient for securing the tires against removal. In this embodiment a channel member 3ᵇ is employed exactly similar to one of the channel members above described and likewise provided with brackets 9—9 and a strap 15. In this case, however, the circle defined by the channel member 3ᵇ is completed by a member 35 which has exactly the same shape and dimensions both longitudinally and laterally as the member 3ᵇ and is permanently hinged thereto at 36, the other ends of the members being detachably secured together as by the clamping device 37 and padlock 38. This construction forms a complete band encircling the tire shoe and can be made in as many units as may be necessary. It will also be clear that many other expedients for securing together the ends of the members can be devised within the terms of the appended claim. The bottom of each of the channel members is preferably provided with one or more apertures 40 to effect the drainage of water which might otherwise collect therein. The strap 15 can be omitted in all cases without materially weakening the device or seriously detracting from its efficiency although its use will be found to protect the tires in some degree by fending the objects which might otherwise collide therewith. The brackets 9 could easily be modified to perform the attachment of the device to other parts of the car than the running board, while many other changes could obviously be made in detailed construction without departing from the scope of my invention.

Having thus described my invention, what I claim is:—

A tire carrying bracket for automobiles comprising, in combination, a continuous semi-circular channel member having a cross section conforming substantially to the exterior of the tire shoe and having a radius of curvature substantially equal to that of said shoe, means for securing said member in an upright position upon the running board of an automobile with its concave side uppermost, and a strap secured to and extending around the upper end of said member.

In testimony whereof, I hereunto affix my signature in the presence of two witnesses.

WILFRED C. SLY.

Witnesses:
 HAROLD E. SMITH,
 BRENNAN B. WEST.